United States Patent [19]
Davison et al.

[11] Patent Number: 5,215,778
[45] Date of Patent: * Jun. 1, 1993

[54] LOW FAT PROCESSED CHEESE PRODUCT HAVING FAT-MIMETIC PROPERTIES AND METHOD OF MAKING SAME

[75] Inventors: Brian C. Davison, Glenview; William H. Schwimmer, Evanston; Laura J. Prostko, Mount Prospect; Alan C. Hamann, Northbrook; Gregory S. Buliga, Mount Prospect; Alice A. Heth, Evanston; Linda K. Jackson, Lincolnshire; Phillip J. Kerwin, Wilmette; Mark S. Miller, Arlington Heights; David G. Pechak, Glen Ellyn; Gary F. Smith, Highland Park, all of Ill.

[73] Assignee: Kraft General Foods, Inc., Northfield, Ill.

[*] Notice: The portion of the term of this patent subsequent to Apr. 30, 2008 has been disclaimed.

[21] Appl. No.: 758,462

[22] Filed: Sept. 6, 1991

Related U.S. Application Data

[63] Continuation of Ser. No. 462,606, Jan. 9, 1990, abandoned, which is a continuation-in-part of Ser. No. 395,800, Aug. 18, 1989, Pat. No. 5,011,701.

[51] Int. Cl.⁵ .................................. A23C 19/00
[52] U.S. Cl. ................................ 426/582; 426/580; 426/658
[58] Field of Search ............... 426/580, 582, 573, 575, 426/574, 658, 589, 613, 519, 520, 521

[56] References Cited

U.S. PATENT DOCUMENTS

| | | | |
|---|---|---|---|
| 3,023,104 | 2/1962 | Battista | 426/549 |
| 4,749,584 | 7/1988 | Wirchansky et al. | 426/582 |
| 4,888,194 | 12/1989 | Anderson et al. | 426/613 |
| 4,898,745 | 2/1990 | Zamzow et al. | 426/582 |
| 5,011,701 | 4/1991 | Baer et al. | 426/602 |

FOREIGN PATENT DOCUMENTS

| | | | |
|---|---|---|---|
| 518961 | 10/1981 | Australia. | |
| 3124725 | 2/1983 | Fed. Rep. of Germany | 426/582 |
| 60-47638 | 3/1985 | Japan | 426/582 |

Primary Examiner—Donald E. Czaja
Assistant Examiner—Anthony Weier
Attorney, Agent, or Firm—Fitch, Even, Tabin & Flannery

[57] ABSTRACT

Substantially fat-free cheese slice products and methods for manufacturing such products, comprising less than about 1.67 weight percent fat.

9 Claims, 2 Drawing Sheets

LOW FAT PROCESSED CHEESE PRODUCT HAVING FAT-MIMETIC PROPERTIES AND METHOD OF MAKING SAME

CROSS-REFERENCE TO RELATED APPLICATIONS

This application is a continuation of application Ser. No. 462,606 filed Jan. 9, 1990 now abandoned, which is a continuation-in-part of U.S. patent application Ser. No. 395,800, filed Aug. 18, 1989, now U.S. Pat. No. 5,011,701, entitled "Low Calorie Food Products Having Smooth, Creamy, Organoleptic Characteristics", which is incorporated by reference herein.

BACKGROUND OF THE INVENTION

The present invention is directed to low calorie, substantially fat-free processed cheese products having textural and organoleptic mouthfeel characteristics simulating conventional processed cheese slice products, as well as to methods for making such products.

Processed cheese is conventionally prepared by blending milkfat-containing cheeses and other dairy products such as non fat dry milk and whey solids with emulsifying salts such as disodium phosphate at elevated temperatures to produce a homogeneous, pumpable, fluid cheese material which may be formed into sheets, slices or other forms, and packaged for consumer use. The substantial milkfat content of processed cheese products not only provides a soft body and texture as well as desirable melt characteristics, but also facilitates the processing at elevated temperatures of the natural cheese components in the manufacturing process. Elimination or even substantial reduction of the fat content of processed cheese may have a detrimental effect on the body and texture of the resulting product as well as the processing of the cheese melt.

Very significant technical effort has been directed over many years toward the development of reduced fat or substantially fat-free food products which possess characteristics simulating the texture and mouthfeel of edible fat-containing food products. Such efforts include the use of various types of undigested fat-like materials such as sucrose polyesters and polyglycerol polyesters which are intended to pass through the digestive system without absorption. Substantial work has also been carried out over an extended period of time with bulking agents such as powdered and microcrystalline cellulose in fat-containing and reduced fat food products. In this regard, for example, U.S. Pat. Nos. 3,067,037, 3,141,875, 3,157,518, 3,251,824, 3,388,119, 3,539,365, 3,573,058, 3,684,523, 3,947,604, 4,199,368 and 4,231,802, 4,346,120, 4,400,406, 4,427,701 and 4,421,778 relate to the preparation, or use of various different types of cellulose in a variety of food products. Such cellulose materials have been used or proposed for various reduced fat or substantially fat-free food products requiring a variety of different formulations. However, as the fat content is reduced in food products containing substantial levels of cellulose materials such as microcrystalline cellulose, adverse effects on the body and texture of the food product, and adverse organoleptic effects such as a mouth-coating or astringency sensations, and a lack of a well-rounded organoleptic characteristics tend to become more pronounced.

It is an object of the present invention to provide improved methods for the manufacture of novel, nutritious, low calorie, substantially fat-free processed cheese products such as processed cheese slices which have textures and well-rounded mouthfeel characteristics simulating conventional processed cheese products themselves, as well as desirable stability and functionality characteristics. It is a further object to provide improved, substantially fat-free processed cheese products which have texture and organoleptic characteristics simulating those of conventional fat-containing processed cheese products. These and other objects of the invention will become apparent from the following detailed description and the accompanying drawings.

DESCRIPTION OF THE INVENTION

The present invention is directed to substantially fat-free, fat-mimetic low calorie processed cheese products, and to methods for manufacturing such substantially fat-free processed cheese products.

Generally in accordance with method aspects of the present invention, methods for preparing substantially fat-free processed cheese products are provided, comprising the steps of blending specific amounts of components comprising comminuted natural skim milk cheese comprising from about 50 to about 60 weight percent water, less than about 1.5 weight percent fat, and from about 40 to about 50 weight percent solids not fat, nonfat dairy solids such as nonfat milk solids, whey solids and mixtures thereof, an aqueous slurry of porous, particulate, microreticulated microcrystalline cellulose in the range of from about 5 to about 20 and preferably from about 8 to about 11 weight percent of microreticulated microcrystalline cellulose, 15-28 DE corn syrup solids, an anionic hydrophylic gum component such as carrageenan, carboxymethyl cellulose, and mixtures thereof, together with emulsifying salts, and a titanium dioxide opacifying agent, to provide a substantially fat-free processed cheese blend. Suitable flavorings such as buttermilk solids, natural and artificial butter and dairy flavor components, enzyme modified cheese, and mixtures thereof, may be utilized as desired. However, flavoring components containing fats should not be used in amounts which will increase the total fat content of the finished product above the minimum desired level of 1.67 weight percent or less. Further in accordance with the method, steam is continuously injected into the blend to heat the blend to a processing temperature in the range of from about 165° F. to about 270° F., preferably 215-225 F. (typically about 220° F.), with mixing, to provide a substantially homogeneous fluidized cheese melt in a continuous flow system. At least about 6 weight percent to about 17 weight percent, and preferably from about 9 to about 14 weight percent of steam is injected into the blend, based on the weight of the blend, at a pressure of at least about 40 psi at a steam temperature of at least 220° F., based on the total weight of the cheese blend. The substantially homogeneous fluidized cheese melt is maintained at the relatively high processing temperature in the range of from about 215° to about 225° F. for at least about 85 seconds or equivalent time-temperature relationship, to provide a high temperature, processed cheese melt. Alternatively, the blend may be cooked by injection of steam in batch mode with mixing in a conventional lay-down cooker to a temperature of at least about 165° F. for at least 3 minutes to provide a high temperature processed cheese melt.

The high temperature processed cheese melt is subsequently flash cooled by discharging the cheese melt into a vacuum zone maintained at a pressure of less than 30 inches of mercury, to remove a sufficient amount of water from the cheese melt to cool the cheese melt to a temperature in the range of from about 140° F. to about 170° F., preferably from about 143° F. to about 147° F. The flash cooled cheese melt may be packaged in accordance with conventional hot packaging procedures to provide a packaged, substantially fat-free cheese product having desirable fat-mimetic characteristics.

Such substantially fat-free processed cheese products are prepared using a natural high moisture skim cheese as a major component. Such high moisture skim milk cheese will generally have a moisture content greater than about 50 weight percent, and usually in the range of from about 50 to about 60 weight percent water, based on the weight of the cheese. The fat-free processed cheese products will include sufficient high moisture skim milk cheese so that it comprises a substantially homogeneous mixture of from about 18 to about 28 weight percent of natural skim cheese on a solids basis, from about 0.25 percent to about 2 weight percent of dispersed, porous, particulate, microreticulated microcrystalline cellulose on a solids basis, from about 53 to about 65 weight percent of water, from about 2 to about 5 weight percent of 15-28 DE corn syrup solids, from about 0.20 to about 0.75 weight percent of a polyanionic gum component, from about 0.5 to about 4.0 weight percent of emulsifier salts, from about 10 to about 20 weight percent of dairy solids, from about 0.5 to about 0.25 weight percent of titanium dioxide, and less than about 1 weight percent of digestible triglycerides. The substantially fat-free processed cheese product should have a pH in the range of from about 5.3 to about 6.1, and preferably in the range of from about 5.60 to about 5.8, and may contain up to about 3 weight percent of flavoring agents and colorants. Particulate condiments, such as pimento, peppers, fat-free natural or analog bacon bits, and the like may also be provided as adjunct components in a matrix of the fat-free processed cheese product which are not included in the above percentage values.

Natural high moisture skim milk cheese is an important component o the fat-free processed cheese products of the present invention. The natural high moisture skim milk cheese may have a moisture content in the range of from about 50 to about 60 weight percent and is prepared from skim milk having a fat content of less than 0.15 weight percent (as is), to provide a skim milk cheese from the skim milk, having less than 1.25, and preferably less than 1.0 weight percent fat. The cheese is cured for at least about 3 weeks, and preferably for a time in the range of from about 3 to about 8 weeks to allow for sufficient breakdown for processing. Prior to blending, the natural high moisture skim milk cheese is ground to provide a finely comminuted natural cheese product for blending with the other components.

The fat-free cheese product also includes dairy solids, such as nonfat dry milk solids, whey solids, or mixtures thereof. These components provide a dairy solids base for the water added to the product with the aqueous microreticulated microcrystalline cellulose dispersion and the steam injection step, to provide a desired solids level in the finished product. The combined dairy solids component should have a fat content of less than 1 weight percent.

As indicated, although the processed cheese product is substantially fat-free, emulsifying salts conventionally utilized in fat-containing processed cheese products are utilized in amounts of from 0.5 to about 4.0 weight percent, based on the total weight of the processed cheese products. Disodium phosphate in an amount of from about 1.5 to about 3 percent and sodium citrate in an amount of from about 0.25 to about 1 weight percent, based on the weight of the processed cheese product, are particularly preferred.

The porous, particulate, microreticulated microcrystalline cellulose component is an important part of the composition of the present invention. Although the microreticulated cellulose comprises only from about 0.25 to about 2 weight percent of the substantially fat-free processed cheese product, it is important in the provision of the texture and mouthfeel characteristics of the product. The microreticulated microcrystalline cellulose is particulate, and has a particle size distribution such that substantially all (i.e., at least about 75 weight percent) of the microreticulated microcrystalline cellulose particles have a maximum dimension of less than about 25 microns. The microreticulated microcrystalline cellulose particles are porous, and in this regard, have a void volume of at least about 25 volume percent, and preferably at least about 50 volume percent of the particles. The microreticulated microcrystalline cellulose particles of the high viscosity aqueous dispersions are believed to be an intimately interconnected product of microfragmented microcrystalline cellulose which has reagglomerated under controlled conditions to form stable, porous particles formed of microcrystalline particle fragments which are connected at spaced-apart zones of contact through crystalline bonding forces. The microreticulated particles of the aqueous dispersion desirably have a mean particle size in the range of from about 2 to about 25 microns, and desirably, at least about 50 percent by weight of the microreticulated microcrystalline cellulose particles of the aqueous dispersion have a maximum linear dimension in the range of from about 2 to about 25 microns and preferably in the range of from about 5 to about 20 microns. It is important that the microreticulated cellulose be prepared from the highly crystalline microcrystalline cellulose. Microcrystalline cellulose is conventionally prepared from wood pulp by acid hydrolysis of cellulose fiber which weakens and dissolves the disordered paracrystalline region and limits the molecular weight distribution and fibril length of the remaining microcrystalline cellulose. Subsequent shearing releases the insoluble, highly crystalline cellulose bundles. [Thomas, W.R., "Microcrystalline Cellulose (MCC or Cellulose Gel)", Food Hydrocolloids, Vol. III (ed. M. Glickman), pp. 9–42 (1986), CRC Press, Inc., Boca Raton, Florida; "Avicel Microcrystalline Cellulose - Product Description", Technical Bulletin G-34, FMC Corporation, Food & Pharmaceutical Products Division, Philadelphia (1985)].

In the formation of the microreticulated microcrystalline cellulose materials, generally solid microcrystalline cellulose crystallites may be progressively converted to porous, microreticulated particles of specific size distribution by a process of controlled microfragmentation and reagglomeration. Microreticulated microcrystalline cellulose dispersions for use in preparing substantially fat-free processed cheese products may be produced by providing an aqueous suspension of a microcrystalline cellulose comprising from about 80 to about 95 percent water and from about 5 to about 20 weight percent microcrystalline cellulose, and preferably from about 8 to about 11 weight percent of microcrystalline cellulose, based on the weight of the aqueous dispersion. The solid microcrystalline cellulose particles may desirably have a mean initial particle size in the range of from about 5 to about 40 microns, such as in the range of from 20 to 30 microns. The aqueous microcrystalline cellulose dispersion is repeatedly conducted through a superpressure, high shear zone to fragment the microcrystalline cellulose to crystalline fragments having a maximum dimension of less than about 1 micron, and reagglomerating the submicron crystalline fragments under high shear conditions at a very small turbulence scale, to produce porous, microreticulated microcrystalline cellulose particles having the desired particle size distribution. By "superpressure high shear zone" is meant a shear zone operated at a driving pressure drop of at least 12,000 psi which is dissipated viscously to heat. Because of their highly crystalline nature, the microcrystalline cellulose particles have a strong tendency to recrystallize after being broken apart, but the size of the recrystallized particles is restricted by the high shear rate, so that microreticulated particles are formed. By "superpressure high shear zone" is meant a shear zone operated at a driving pressure drop of at least 12,000 psi which is dissipated viscously to heat.

The particle size distribution of the predominant proportion of the microreticulated microcrystalline cellulose particles (e.g., 8 to 12 μm) is on the order of the size of emulsified fat droplets in many products. For example, butterfat droplets in milk used in the manufacture of natural cheese for conventional processed cheese may average about 4 μm. The porous, microreticulated microcrystalline cellulose particles may be able to mimic fat-like characteristics in a substantially fat-free processed cheese product because they form porous, flexible structures which are about the same size as fat droplets. The functionality of the microreticulated microcrystalline cellulose material in the processed cheese product of the present invention may result at least in part from its ability to retain water within its interstices, particularly having a composition differing from the blend outside of the microreticulated cellulose particles. The microreticulated cellulose dispersion serves to make the protein matrix discontinuous, and retards product toughening over extended storage periods.

As indicated, the initial microcrystalline cellulose material is repeatedly conducted through the superpressure high shear zone. In this regard, the microcrystalline cellulose material should best be conducted at least twice, and preferably at least three times through a high shear zone having a shear rate of at least about $5 \times 10^6$ (e.g., $1 \times 10^7$) seconds$^{-1}$ at a specific turbulent energy dissipation rate of at least about $8.5 \times 10^5$ ergs per cubic centimeter of the high shear zone. The superpressure high shear zone should best have a shear rate of at least about $1 \times 10^7$ inverse seconds, with a turbulent energy dissipation rate sufficient to raise the temperature of the suspension at least about 30° C. through viscous dissipation of input energy to heat. Preferably, all of the microcrystalline cellulose slurry is conducted serially through the superpressure high velocity and shear fragmentation zone, so that all of the material which has passed through one stage of processing is conducted to the next stage of processing. However, processing may also be carried out by recycle in a stirred tank reactor mode, which, however, is not as efficient. In a flow through system with continuous high shear treatment, the specific energy requirement (the energy dissipation rate per unit throughput of product stream) may desirably be at least about $1 \times 10^8$ ergs per gram. Preferably, a turbulent energy dissipation rate of at least about $4 \times 10^{11}$ ergs per pound of aqueous dispersion is provided per pass through the high shear, high velocity zone. The kinetic and shearing forces are dissipated and converted viscously to heat and fragmentation of the microcrystalline cellulose, and the temperature of the dispersion should rise at least about 30° C. upon conduction through the superpressure microfragmentation zone.

As indicated, microreticulated microcrystalline cellulose dispersions may be prepared by subjecting an aqueous slurry or suspension of the microcrystalline cellulose to intense shear at very high driving pressures to provide the microfragmentation and microporous reagglomeration treatment. Effective results have been achieved by using a CD30 or CD150 homogenizer (A.P.V. Gaulin Corp., Boston, MA) or a Rannie homogenizer (A.P.V. Rannie, Copenhagen) using a knife edge homogenization element within a closely surrounding impact ring at an inlet pressure of at least about 12,000 psig and preferably at least 13,000 psig, to obtain microporously reagglomerated microfragments having a mean particle size in the range of from about 5 microns to about 15 microns in maximum dimension.

The finished product has a smooth, creamy texture with a white appearance and a bland taste. The total solids content is preferably in the range of from about 8 to about 11 weight percent (e.g., about 10 weight percent) and the viscosity is preferably in the range of from about 10,000 to about 40,000 centipoise (e.g., 15,000 cps).

The microreticulated, microcrystalline cellulose dispersion is combined with specific amounts of gums and low dextrose corn syrup solids in the processed cheese product to provide smooth, fat-like organoleptic mouthfeel and texture characteristics in the processed cheese product. In this regard, the processed cheese products comprise from about 0.25 to about 0.75 weight percent of food grade polyanionic gum such as xanthan gum, carrageenan, carboxymethyl cellulose and mixtures thereof. Mixtures of carrageenan and a food grade carboxymethyl cellulose are particularly preferred. Carboxymethyl cellulose is a water-soluble polymer formed by providing cellulose with pendant carboxymethyl groups. A degree of carboxymethyl substitution in the range of from about 0.4 to about 1.0 (e.g. 0.9) is preferred.

Carrageenans are structural polysaccharides of red sea plants such as *Chondus crispus* and *Gigartina stellata*. There are several varieties of carrageenans which may be extracted from red sea plants for food use, including kappa, lambda and iota carrageenans. Carrageenans, including iota, kappa and lambda carrageenans, are strongly charged anionic polyelectrolytes of high molecular weight and regular configuration which have anionic sulfate ester groups regularly disposed along a polysaccharide backbone. Kappa carrageenan is particularly preferred.

It is important to add the gum without clumping or aggregation so as to form a well mixed dispersion in the processed cheese product. The gum is desirably added directly, in dry form in admixture with other powdered components such as powdered skim milk and powdered dried whey solids, to the ground skim cheese and highly viscous microreticulated microcrystalline cellulose aqueous dispersion under conditions of shear, such as in a ribbon blender. Alternatively, the gum components, alone or in admixture with other powdered components, may first be blended with the aqueous microreticulated cellulose dispersion to provide a uniform wet mix blend, which may subsequently be combined with the ground skim milk cheese and any remaining components. In this regard, the gums may be mixed and dissolved directly in the aqueous microreticulated microcrystalline cellulose dispersion, or may be premixed with other dry and preferably powdered components before such mixing and dissolution in a suitable mixer, such as a Breddo mixer.

Low DE corn syrups are utilized in the substantially fat-free processed cheese products of the present invention to provide a limited degree of sweetness and to replace fat solids. The low dextrose equivalent corn syrup component in specific proportions has a dextrose equivalency in the range of from about 15 to about 28, and preferably in the range of from about 20 to about 25. Such 15-28 DE corn syrup solids may be provided by acid, enzyme, or acid-enzyme hydrolysis of corn starch. The dextrose equivalent (DE) value may be calculated according to the formula $DE = 100/(M_n/180.16)$ where $M_n$ is the number average molecular weight of the corn syrup solids. Such low 15-28 DE corn syrup solids may be provided in the processed cheese products in combination with other components particularly including the microreticulated microcrystalline cellulose, the gum component and the natural skim cheese component, in order to provide a finished product which has desirable, fat-mimetic characteristics, but is substantially fat-free. In this regard, the processed cheese product may desirably comprise from about 2 to about 5 weight percent, and preferably in the range of from about 3 to about 4 weight percent of such 15-28 DE corn syrup solids based on the total weight of the processed cheese product. The low dextrose equivalent corn syrup solids are believed to provide the substantially fat-free processed cheese products with more pleasing fat-mimetic characteristics.

Figure 1:
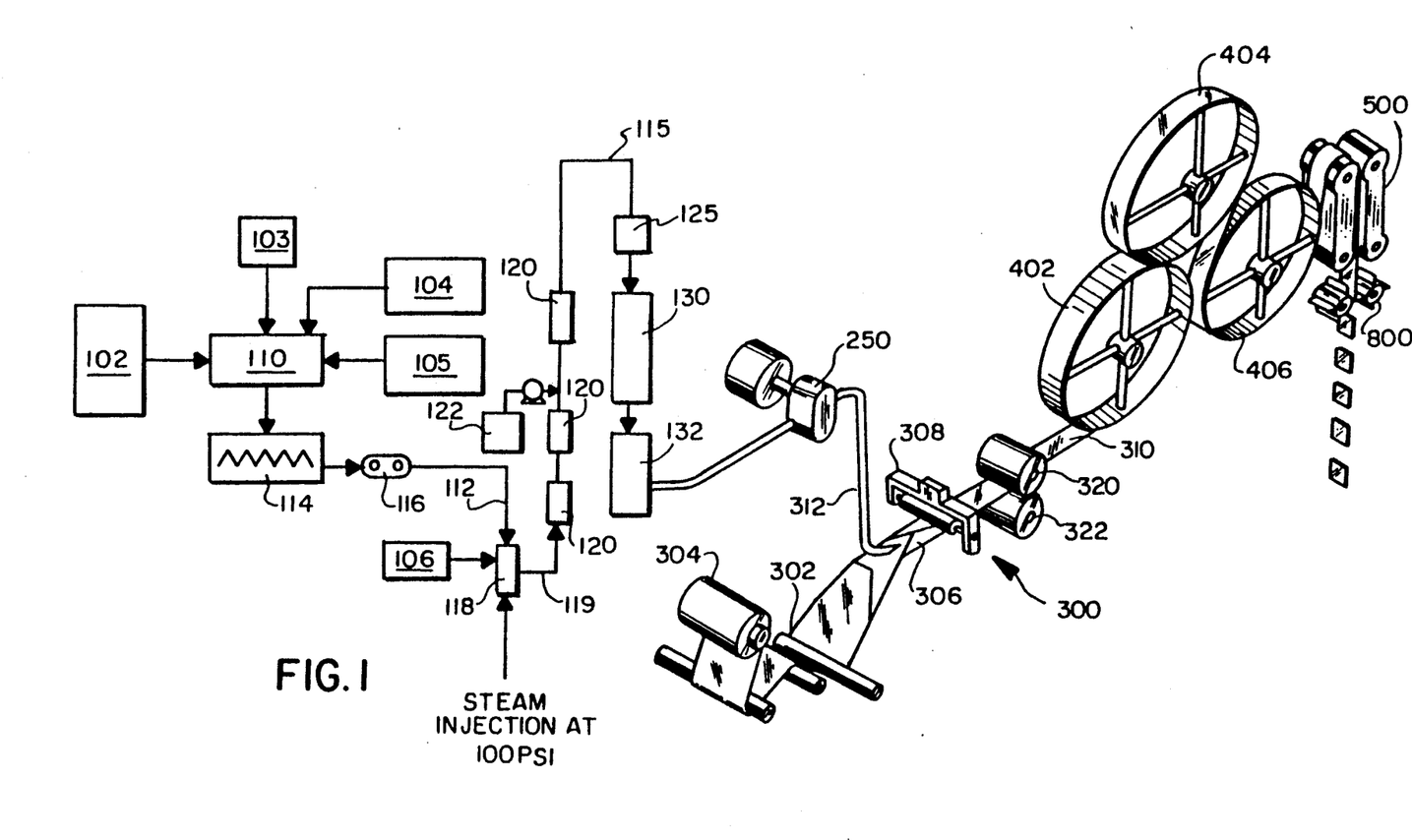
FIG. 1 is a process flow diagram illustrating a specific embodiment of a method for manufacturing an embodiment of a fat-free processed cheese product in accordance with the present invention.

Having generally described manufacture of microfragment dispersions, various aspects of the invention will be further described with respect to methods and apparatus schematically illustrated in FIG. 1.

FIG. 1 is a schematic flow sheet depicting one embodiment of a method for the manufacture of substantially fat-free processed cheese products by an in-line method in accordance with the present invention.

As shown in FIG. 1, an aqueous microreticulated microcrystalline cellulose dispersion 102 comprising about 10 weight percent of microreticulated microcrystalline cellulose, comminuted natural skim milk cheese 103, dry components 104 and a wet component mix 105 as described hereinafter are combined in appropriate proportions and thoroughly mixed in a suitable blender such as a ribbon blender 110. The preparation of the aqueous microreticulated microcrystalline cellulose slurry 102 and the skim milk cheese 103 are illustrated in FIGS. 2 and 3, respectively.

Figures 2, 3:
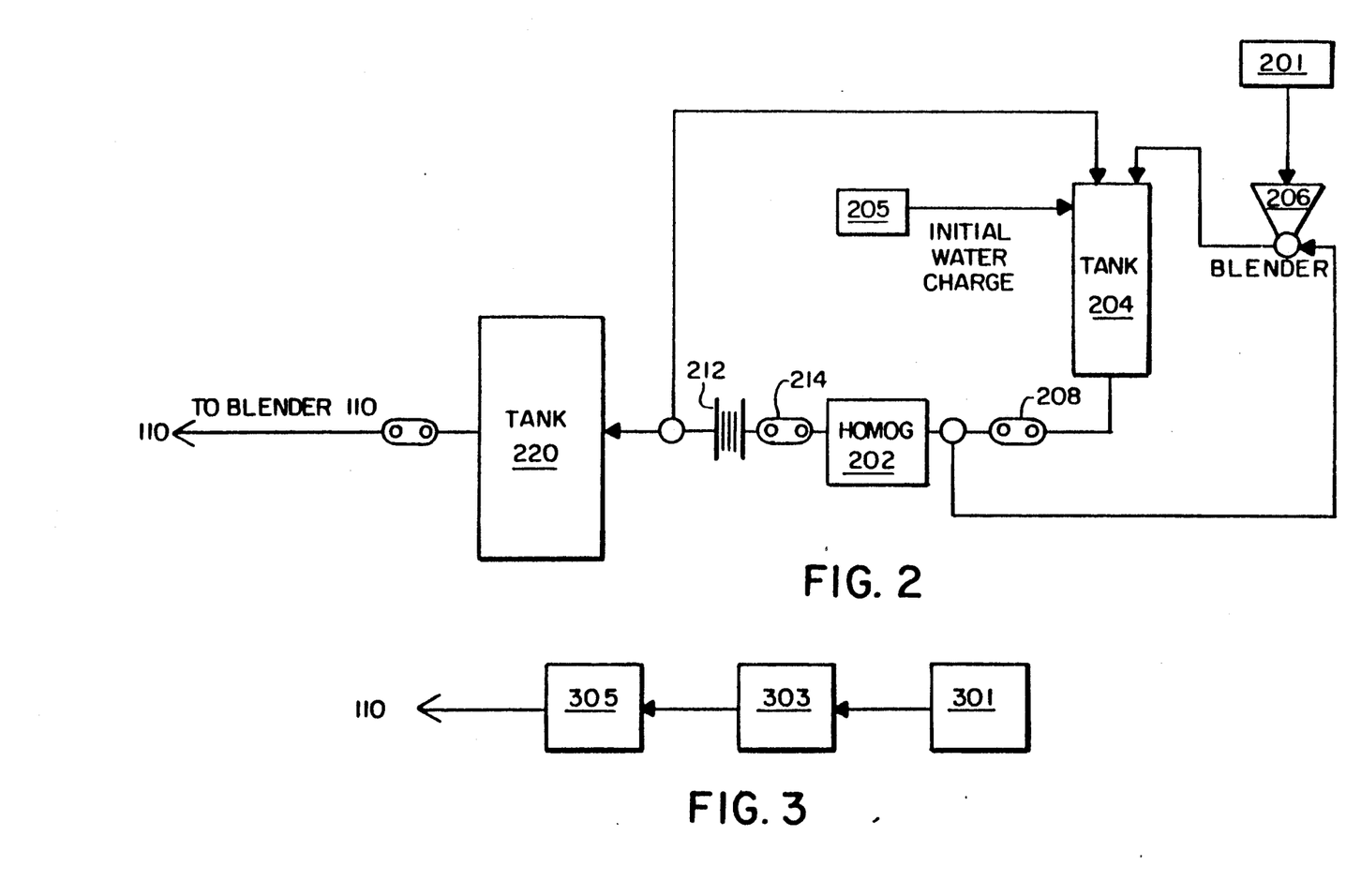
FIG. 2 is a schematic diagram illustrating a specific embodiment of a multiple pass continuous method of the continuous stirred tank reactor type for manufacture of microreticulated microcrystalline cellulose aqueous dispersions which may be utilized in the method illustrated in FIG. 1.
FIG. 3 is a schematic diagram illustrating the natural skim milk cheese manufacture and grinding process for providing ground skim cheese for use in the method of FIG. 1.

As shown in FIG. 2, the aqueous microreticulated microcrystalline cellulose dispersion is prepared by multiple-pass superpressure microreticulation treatment of an aqueous microcrystalline cellulose slurry. The microreticulated microcrystalline cellulose dispersion 102 may be prepared using homogenizers in either a volumetric or series pass configuration to provide multiple passes through a superpressure shear zone. As shown in FIG. 2, a microcrystalline cellulose 201 such as the PH101 microcrystalline cellulose product of FMC Corporation is mixed with sufficient water circulated by pump 208 through tank 204, by means of blender 206, to provide an aqueous slurry of 10 weight percent microcrystalline cellulose in water. Full hydration of the starting material is an important step for obtaining the desired fat-like, microreticulated microcrystalline cellulose functionality. The microcrystalline cellulose may desirably be boiled in aqueous suspension or may be heated during microfragmentation treatment by allowing the temperature to rise through input energy dissipation in the aqueous dispersion.

Initially the microcrystalline cellulose material is in the form of very densely-packed solid crystalline cellulose particles, which may have an average particle length of, for example, 20 to 30 μm (longest dimension, e.g., when measured by a particle size analyzer such as a MicroTrac Particle Analyzer), but with many particles as large as 200 μm by light microscopy, and a very low viscosity. After the aqueous slurry is prepared, valve 210 directs the circulating flow from tank 204 through superpressure homogenizer 202, where the aqueous slurry is processed at a driving pressure of about 13,000 psi and a processing rate of about 15 gallons per minute. The homogenizer 202 output is conducted through plate heat exchanger 212 by pump 214, and is diverted to tank 204 for repeated recycle through the superpressure homogenizer 202. After 1 or 2 passes through a superpressure high shear homogenizer, there are many isolated crystallites (about 1×0.1 μm) but still mostly densely packed solid crystals (about 10 μm in their longest dimension). The microreticulated microcrystalline particles are formed progressively with multiple passes through the high shear zone.

After being forced and sheared through a 0.0014 inch gap under 13,000-13,500 psi pressure, the microcrystalline cellulose dispersion reaches velocities approaching 1,000 ft/sec or more, and the microcrystalline cellulose dispersion is forced to abruptly change direction by the surface of an impact ring at such high velocity, resulting in the division of microcrystalline cellulose crystals and the generation of crystallite fragments which recrystallize imperfectly in a reticulated, porous structure, thereby building the microreticulated microcrystalline cellulose viscosity.

After multiple passes through the superpressure homogenizer at a small turbulence scale, microreticulated aggregates (which appear under microscopy to be like "cotton balls") of crystallites are apparent, with a particle size, for example, of 10 to 15 μm. Very few isolated submicron crystallites or dense crystalline particles can be seen. Eventually the entire continuous phase may be crowded with the aggregated microreticulated microcrystalline cellulose particles, even though the solids content is relatively low, and the viscosity becomes very high. After the tank has been recycled approximately 5 times through the superpressure homogenizer 202, the slurry reaches a viscosity of about 15,000 centipoise. The microcrystalline cellulose slurry travels in a loop between the superpressure microreticulation device 202, which may be a CD30, CD150 or Rannie homogenization apparatus at high driving pressure (e.g., 13,000-13,500 psi) provided by the homogenizer 202 and the hold tank 204. The effective number of passes through the superpressure micro-fragmentation zone is calculated based on the volume of the batch and the flow rate of the material, with time for one pass being equivalent to the time it takes for the entire volume to be conducted through the superpressure shear zone at the treatment flow rate. Upon completion of a desired number of volumetric passes, the microreticulated material in the tank 204 may be conducted directly to the blender 110 (FIG. 1) or to intermediate storage 220 prior to being conducted to the ribbon blender 110.

While the illustrated embodiment uses a recirculating tank configuration, a series pass configuration may also be used, as described in parent U.S. patent application Ser. No. 395,800, now U.S. Pat. No. 5,011,701. In the series pass configuration, the material passes through each homogenizer (up to 6) only once, which is more effective per volumetric pass.

The make an grinding procedures for the natural high moisture skim milk cheese for the fat-free slice product of the present invention, as shown in FIG. 3, are similar to the processes employed for conventional cheese making. However, in the illustrated embodiment, skim milk cheese is prepared which is of a relatively high moisture content, e.g., 56%, which is typically cured for about 3-8 (e.g. 4) weeks, to provide sufficient breakdown of the body and texture for processing.

High moisture skim milk cheese may be prepared having a high moisture body, for example, as follows:

Skim milk having the lowest fat content (e.g., less than 0.15% to obtain ≦1.0% fat in the finished product) is pasteurized at 163° F. for 16-18 seconds. The skim milk is ripened for 30-60 minutes at 88-90° F. using sufficient lactic starter culture to obtain a draw pH of 5.70-5.90.

Sufficient rennet to accomplish a medium-firm set in 30 minutes is added, and after a set has developed, the curd is cut with ¼"-3/8" knives.

After a quiescent period, the cut curd and whey are stirred and cooked to a temperature of 96° F. in 25-30 minutes. Increased stirring is initiated to prevent curd settling, if necessary. The whey is drawn off at 1.75-2.25 hours from set, with the pH of the curd being 5.6 at draw. The draw time may be varied for moisture control. All free whey is removed from the curd (at pH 5.55-5.75) within 30 minutes from the start of draw, and the curd is washed by flooding or spraying with cool water 30-40 minutes from the start of draw. The washed curd at pH 5.45-5.60 is salted at about 2:35 to 3:00 hours from the time of curd setting, which time may be varied for moisture control. Sufficient sodium chloride is applied to obtain a finished salt content of about 1.0 weight percent, and the curd is filled in suitable containers as boxes or barrels after application of the salt.

Whey is removed (e.g., by press/probe or drainerpress methods) and the curd is pressed and vacuumed, and then cooled to about 40° F. over 6-10 days. After initial cool-out, the cheese may be cured at 40-45° F. for 4-6 weeks to provide cured high moisture natural skim cheese blocks 301 which have a fat content of less than 1 weight percent (e.g., .86 weight percent), and a water content of 54-58 (e.g., about 56) weight percent. In order to provide for effective mixing and homogenization of the high moisture fat-free natural cheese with the other components, it is comminuted and thoroughly ground to provide a skim cheese paste. In this regard, the cured cheese blocks 301 are broken in a curd breaker 303, and forced through a grinder 305 of the type designed for grinding frozen meats to provide a thoroughly comminuted high moisture natural cheese material. In the illustrated embodiment, a Reitz RE-24 Extructor is utilized to thoroughly comminute the natural cheese product. As shown in FIG. 1, the high moisture comminuted natural cheese material 103 is blended with the aqueous microreticulated cellulose dispersion 102, the various dry components 104, and the various wet mix components 105, (with the exception of water condensate which is added during cooking) as follows:

| Ingredient | Total Weight % | Weight % Water |
|---|---|---|
| Skim Milk Cheese | 53.244 | 29.817 |
| Microreticulated Cellulose Slurry | 5.263 | 4.763 |
| Nonfat Dry Milk | 4.817 | 0.193 |
| Dried Whey | 5.864 | 0.235 |
| 24 DE Corn Syrup | 3.404 | 0.204 |
| Buttermilk Powder | 1.360 | 0.038 |
| Disodium Phosphate | 2.125 | 0.425 |
| Sodium Chloride | 1.000 | 0.000 |
| Sodium Citrate | 0.341 | 0.041 |
| Flavors | 0.670 | 0.000 |
| Sorbic Acid | 0.200 | 0.000 |
| Titanium Dioxide | 0.140 | 0.000 |
| Carrageenan | 0.170 | 0.020 |
| Carboxymethyl Cellulose | 0.170 | 0.020 |
| Vitamin A | 0.005 | 0.000 |
| Water | 15.376 | 15.376 |
| Water Condensate (net) | 5.850 | 5.850 |
| | 100.00 | 57.00 |

The cheese slice product comprises less than 1.67 weight percent fat, and preferably less than 1 weight percent fat (e.g., 0.71 weight percent fat), based on the total weight of the processed cheese product.

The wet mix 105 is prepared by adding, in order, the specified amounts of dry whey solids, buttermilk powder, nonfat dry milk and corn syrup solids to sufficient water to prepare a 60%±1.0% solids mixture, which is introduced promptly after formulation into the blender 110.

An "emulsifier" slurry 106 is prepared by adding disodium phosphate to sufficient heated water (160° F.) to prepare a 30%±1% solution, which is maintained at a slurry temperature of 160° F.±5° F. The disodium phosphate (or other conventional "emulsifier salt") serves to assist melting of the high moisture natural cheese component.

The high moisture skim cheese is ground to a diameter of no more than 7/32", and promptly added to the ribbon blender 110 with ribbons running with sorbic acid, colors, flavors, and dry powders/salts. The components are mixed for two minutes after all dry ingredients, remaining sorbic acid, carboxymethyl cellulose gum, carrageenan gum, titanium dioxide, sodium citrate, sodium chloride and Vitamin A have been added. Wet mix components are then added while blending the mixture in the ribbon blender. Microreticulated cellulose slurry is followed by addition of remaining water.

The mixture is blended for 15 minutes after the last addition. Once proper blending is complete, the raw materials may be subjected to emulsifier 106 injection and steam injection cooking under specific high temperature, short time conditions. In this regard, steam is continuously injected directly into the cheese components as they are continuously forced through a confined steam injection region and is substantially condensed within the confined region thus heating and melting the raw material into a molten mass. The molten mass is subjected to shear due to the turbulence caused by introduction of the steam and the action in the confined region which results in partial emulsification and homogenization of the molten mass. Sufficient steam is introduced into the cheese blend at a temperature of at least about 220° F. and a pressure of at least about 40 psi to provide a molten mass, and generally sufficient steam is introduced to heat the molten mass to a temperature in the range of from about 165° F. to about 270° F., preferably 215-225° F. At least about 6 weight percent of water (e.g., 12.5 pounds of condensed steam water per 100 pounds of the cheese blend), as steam condensate, will be introduced into the cheese melt by the continuous cooking process. This cook temperature should be monitored carefully, to prevent loss of body and/or product stability. The condensation of the steam in the molten cheese mass also substantially increases the moisture content, thus aiding in the cooking process. The molten fat-free processed cheese mass is delivered from the steam injection cooking zone to a mixing zone where the steam or moisture is mixed with the cheese and the temperature of the molten cheese mass is equilibrated. The fat-free molten cheese melt is maintained at the cook temperature for at least 1.5 minutes. The molten cheese is delivered from the mixing zone to a flash-cooling zone having a pressure lower than the pressure of the cooking zone. The molten cheese should be maintained at an elevated temperature of 190-225° F. for at least a length of time in the range of from about 85 to about 150 seconds and preferably from about 88 to about 120 seconds, and accordingly should be rapidly transported through the steam injection and mixing zone(s). As the molten cheese passes from the mixing zone to the cooling zone, flash expansion or cooling of the molten cheese takes place causing deaeration and vaporization of a portion of the moisture in the molten cheese. The amount of vaporization which takes place determines the final moisture and temperature of the finished cheese and is dependent on the absolute pressure in the cooling chamber.

Control of the final moisture and temperature of the process cheese product may be attained by controlling the absolute pressure in the cooling chamber. An amount of moisture is removed, as vapor, from the cheese as it is cooled in the cooling chamber from its cooking temperature to the final cooling chamber discharge temperature. However, there is a net contribution of moisture from the steam heating step.

Referring now to FIG. 1, a single blender 110 is illustrated, but it is to be understood that any number of blenders may be utilized to provide raw material in proper condition for cooking. In a preferred embodiment of the invention, at least two blenders are utilized which alternately feed raw material to the continuous in-line cooking system of FIG. 1.

The blended raw material is delivered from the ribbon blender 110 to an auger 114 to provide a positive supply of cheese from the blender to a pump 116.

The feed pump 116 may be of any design capable of pumping the material through a conduit into a steam infusor 118 which is operated at a pressure above atmospheric pressure. A preferred form of feed pump is a positive displacement pump utilizing lobe rotors. A check valve (not shown) may be provided in the conduit between the pump and the bayonette steam infusor 118 to prevent back flow of product from the infusor. The steam infusor 118 receives sanitary steam at a pressure of at least 100 psi from a suitable source through a line and a control valve (not shown). A preferred design of the steam infusor 118 is disclosed in detail in U.S. Pat. No. 4,112,131, which is incorporated herein by reference. The steam and emulsifier solution 106 is injected into and condensed in the comminuted high moisture natural skim cheese, and microreticulated cellulose is blended in a region of confined turbulence in order to heat the cheese to form a molten mass and to effect partial mixing of the steam with the raw material. A temperature sensing device 112 is provided which may be utilized with a conventional control system to monitor the amount of steam through the control valve to maintain the temperature of the cooked product in the range of 215-225° F., with a maximum temperature of 225° F.

From the high pressure steam infusor 118, the fluidized fat-free cheese mass is delivered through conduit 119 to a mixing zone which includes one or more static mixtures 120 and a strainer in the conduit. An in-line water pump 122 may be used to adjust the water content, as desired.

The conduit systems 119, 120, 122 are of suitable length to provide the desired hold time of about 90 seconds (i.e., 125 feet at about 190 pounds per minute for 2.5 inch ID piping) and the interior of the conduits. Two 2"×24" long static (Kenics) mixers 120 are located following in-line steam injection. After passing through the static mixers 120, the fluidized product runs through approximately 20 feet of stainless steel piping 115 containing one or more line strainers to the flash tank 125, and from there to flash-cooling surge tank 130. A cook temperature not to exceed 225° F. (preferably 215-225° F. is used, with a flash cool to a temperature of approximately 145-165° F.).

The static mixers 120 are fixed in-line mixers having no moving parts. A static mixer has a series of fixed, helical elements enclosed within a tubular housing. The static mixer is utilized to finish mixing the steam with the fluidized mass under process flow conditions to provide a homogeneous fluidized blend. Strainer plates are used to assist mixing and to prevent undesired lumps of material from the infusor 118 from proceeding through the system.

The molten blend is then passed through a pressure controlled valve into the flash-cooling tank 130 maintained at a vacuum of 18-30 inches of mercury. The vacuum is maintained at the desired level by means of a vacuum control circuit which may be of conventional design and includes a sensor and a vacuum controller which controls a valve in the vacuum line.

When the molten mass is delivered through the valve into the flash-cooling tank 130, the rapid reduction in pressure causes deaeration of the molten mass and also causes a portion of the water contained in the molten mass to be vaporized, thereby reducing the temperature of the molten mass and reducing its water content. However, this is a net contribution from the steam infusion step over the flash-cooling step, which is shown as net water condensate in the above composition listing.

The molten mass is collected at the bottom of the cooling tank, which is desirably conically shaped. The molten mass is discharged to a product discharge pump and a surge tank 132 which serves as a temporary storage vessel for continuous processing. The cooling tank may be provided with an agitator or auger (not shown) to facilitate discharge of the molten cheese mass. The pump, which may be of conventional design and may be generally similar to the input pump, provides for discharge of the processed cheese product through the conduit to a suitable station for packaging.

In the illustrated embodiment, the viscous fluidized, substantially fat-free cheese mass at a temperature of 140-165° F. is delivered to conventional hot pack slice equipment. A fill temperature of approximately 143° F.-147° F. is optimum. The product can be filled into conventional single slice inner wrap and overwrap packaging systems such as described in U.S. Pat. No. 4,586,317 which is incorporated by reference herein.

In the hot pack single-slice packaging apparatus, the molten cheese product is discharged under positive pressure to a positive metering pump 250. The metering pump 250 is adapted to discharge the molten cheese product at a precisely controlled rate to an extruding nozzle of the film forming station 300. The positive metering pump 250 may desirably be varied in its pumped output under automatic or operator control in conjunction with the operation of the extruding nozzle and film forming station 300. In this regard, a suitable controller (not shown) may function to sense and coordinate the operation of the various components of the system.

The extruding nozzle and film forming station 300 comprises a film dispensing apparatus 302 for a continuous roll of transparent or semi-transparent, heat sealable wrapping material 304. The wrapping material is continuously formed into a tube 306 which may be overlapped (or longitudinally sealed) to form a continuous film tube of substantially constant diameter.

The molten cheese product is discharged into the film tube by means of extrusion nozzle 312. The rate of introduction of the molten cheese product into the film tube is coordinated with the forward motion of the film tube to provide steady state operation of the system. Sizing rolls 320, 322 may be provided to flatten the longitudinally sealed film tube and enclosed heat settable molten cheese product to a desired product thickness, which will generally be in the range of from about 1/16 to about 3/16 in the illustrated embodiment. A "bead" of the molten cheese product may be maintained ahead of the rollers 320, 322 to insure the uniform filling of the tube. Sterile air, nitrogen or carbon dioxide may also be introduced into the extrusion zone upstream (toward the roll 304) of the point of introduction of the molten cheese product, if desired, in order to maintain a counter current packaging atmosphere.

The flattened film tube 310 which is substantially filled throughout its cross section with the viscous, deaerated molten cheese product, is pulled through the film forming station 300 by means of a plurality of at least two film pulling wheels 402, 404, 406 of film pulling and cooling station 500. The wheels 402-406 are relatively large, and are intended to provide extended contact for uniform heat conduction to cool the cheese slices to a temperature of 55-75° F. The cooling wheels 402-406 may desirably be cooled to a temperature in the range of from about 40° F. to about 60° F. by means of refrigerant circulated within the wheel structure. The cooled, wrapped cheese product may be conducted to a sealing apparatus such as described in U.S. Pat. No. 4,586,317 of the present assignee, which is incorporated herein by reference, comprising two opposing arrays of sealing elements and voiding elements, respectively arranged and interconnected in the form of belts which may be driven in registration at relatively high speed.

The wheels may be cooled by a continuously circulating coolant which is pumped through the wheel structure. At about 70° F. or less, the slices are more easily stacked and overwrapped by packaging equipment, and accordingly, it is desirable to cool the packages to such lower temperatures on the cooling wheels, or by subsequent cooling.

The cooled slices are subsequently conducted to a transverse cutting and packaging station 800 which may be of conventional design in which the film tube slices are transversely cut at approximately the center of the cross seals to provide individual packages. The entire apparatus and its corresponding cutting station may be operated continuously at relatively high speed to provide flat, undistorted individually wrapped slices with package cross seals of desirable uniform strength and integrity and having excellent bacteriological stability.

The individual slice packages may be stacked in layers of from about 3 to about 25 or more slices, and overwrapped with a suitable, preferably substantially gas impermeable, substantially light-impermeable, packaging material, which forms a substantially hermetically sealed package around the individual slices, such as described in U.S. Pat. No. 4,792,457 which is incorporated herein by reference. Such overwrap packaging may be carried out in accordance with conventional packaging practice, there being a wide variety of packaging methods and materials which are suitable for carrying out such overwrap packaging. The sealed, overwrapped package provides the consumer with a sealed unit containing a plurality of individually wrapped slices which are not removed from the time of pasteurization until needed by the consumer.

Accordingly, it will be appreciated that in accordance with the present invention, substantially fat-free processed cheese products have been provided which have desirable fat-mimetic characteristics despite the lack of milkfat. While the methods and processed cheese products have been described with respect to certain specific embodiments, it will be appreciated that various modifications and adaptations may be made based on the present disclosure, which are intended to be within the scope of the following claims.

What is claimed is:

1. A method for preparing a substantially fat-free processed cheese product comprising the steps of blending comminuted natural skim milk cheese comprising from about 50 to about 60 weight percent water, less than about 1.67 weight percent fat and from about 40 to about 50 weight percent solids not fat, nonfat dairy solids, an aqueous slurry of porous, particulate, microreticulated microcrystalline cellulose comprising from about 5 to about 12 weight percent of microreticulated microcrystalline cellulose solids, low DE corn syrup solids, an anionic hydrophilic gum component and emulsifying salts to provide a substantially fat-free processed cheese blend, said microreticulated microcrystalline cellulose being prepared by the steps of heating and repeatedly shearing at least two times an aqueous dispersion comprising from about 5 to about 12 weight percent of microcrystalline cellulose and from about 88 to about 95 weight percent water in a high shear zone having a pressure drop of at least 12,000 psi to fragment the microcrystalline cellulose fragments and reagglomerating the crystalline cellulose fragments under high shear conditions to produce an aqueous dispersion of porous, microreticulated microcrystalline particles having a void volume at least about 25 volume percent, a particle size in the range of from about 5 to about 20 microns, and having a mean particle size in the range of from about 5 to about 20 microns.

heating the cheese blend to a processing temperature in the range of from about 165° F. to about 270° F., with mixing, to provide a substantially homogenized fluidized cheese melt, maintaining the substantially homogeneous fluidized cheese melt at said high processing temperature for at least about 85 seconds at 220° F. or equivalent time-temperature relationship, to provide a high temperature processed cheese melt, cooling the high temperature processed cheese melt to a temperature in the range of from about 140° F., to about 170° F., and packaging the cooled cheese melt to provide a packaged, substantially fat-free processed cheese product having less than 1.67 weight percent fat and desirable fat-mimetic characteristics.

2. A substantially fat-free processed cheese product having fat-mimetic characteristics comprising a substantially homogeneous mixture of from about 18 to about 28 weight percent of natural high moisture skim milk cheese on a solids basis, from about 0.25 percent to about 2 weight percent of dispersed, porous, particulate, microreticulated microcrystalline cellulose on a solids basis, from about 53 to about 65 weight percent of water, from about 2 to about 5 weight percent of low DE corn syrup solids, from about 0.25 to about 0.75 weight percent of a polyanionic gum component from about 0.5 to about 2.5 weight percent of emulsifier salts, from about 10 to about 15 weight percent of dairy solids and less than about 1 weight percent of digestible triglycerides, said microreticulated microcrystalline cellulose being prepared by the steps of heating and repeatedly shearing at least two times an aqueous dispersion comprising from about 5 to about 12 weight percent of microcrystalline cellulose and from about 88 to about 95 weight percent water in a high shear zone having a pressure drop of at least 12,000 psi to fragment the microcrystalline cellulose fragments and reagglomerating the crystalline cellulose fragments under high shear conditions to produce an aqueous dispersion of porous, microreticulated microcrystalline particles having a void volume at least about 25 volume percent, a particle size in the range of from about 5 to about 20 microns, and having a mean particle size in the range of from about 5 to about 20 microns.

3. A method in accordance with claim 1 wherein said heating is effected by injecting steam into said cheese blend.

4. A method in accordance with claim 3 wherein said steam is injected at a level of from about 6 to about 17 percent by weight, based on the total weight of the cheese blend.

5. A method in accordance with claim 1 wherein said cheese blend also includes a titanium dioxide opacifying agent.

6. A method in accordance with claim 1 wherein said low DE corn syrup solids has a DE of from about 15 to about 28.

7. A method in accordance with claim 1 wherein said cooling is effected by flash cooling the high temperature processed cheese melt by discharging the cheese melt into a vacuum zone maintained at a pressure of less than about 30 inches of mercury.

8. A cheese product in accordance with claim 2 wherein said low DE corn syrup solids has a DE of from about 15 to about 28.

9. A cheese product in accordance with claim 2 which also comprises from about 0.5 to about 0.25 weight percent of titanium dioxide.

* * * * *